US009772246B2

(12) United States Patent
Hoffman et al.

(10) Patent No.: US 9,772,246 B2
(45) Date of Patent: Sep. 26, 2017

(54) FILL FLUID THERMAL MANAGEMENT

(71) Applicant: Rosemount Inc., Chanhassen, MN (US)

(72) Inventors: Michael James Hoffman, Rosemount, MN (US); Paul Ryan Fadell, Spring Lake Park, MN (US); Scott Robert Thompson, Lakeville, MN (US); Vincent Edward Cline, Brenham, TX (US)

(73) Assignee: Rosemount Inc., Chanhassen, MN (US)

( * ) Notice: Subject to any disclaimer, the term of this patent is extended or adjusted under 35 U.S.C. 154(b) by 25 days.

(21) Appl. No.: 14/501,691

(22) Filed: Sep. 30, 2014

(65) Prior Publication Data

US 2016/0091383 A1    Mar. 31, 2016

(51) Int. Cl.
    *G01L 19/00*      (2006.01)
    *G01L 19/04*      (2006.01)
    *G01L 19/06*      (2006.01)

(52) U.S. Cl.
CPC .......... *G01L 19/04* (2013.01); *G01L 19/0007* (2013.01); *G01L 19/0046* (2013.01); *G01L 19/0681* (2013.01)

(58) Field of Classification Search
CPC . G01L 19/04; G01L 19/0046; G01L 19/0681; G01L 19/0007
USPC .......................................... 73/706, 708, 715
See application file for complete search history.

(56) References Cited

U.S. PATENT DOCUMENTS

| 4,169,387 A * | 10/1979 | Krempl .................. G01D 3/028 165/104.26 |
| 4,722,228 A | 2/1988 | Awa et al. |
| 5,046,365 A | 9/1991 | Kumley et al. |
| 5,292,195 A | 3/1994 | Crisman, Jr. |

(Continued)

FOREIGN PATENT DOCUMENTS

| CA | 1 192 418 | 8/1985 |
| DE | 2 211 609 | 9/1973 |

(Continued)

OTHER PUBLICATIONS

Invitation to Pay Additional Fees from PCT/US2015/035244, dated Feb. 11, 2016.

(Continued)

*Primary Examiner* — John Fitzgerald
(74) *Attorney, Agent, or Firm* — Westman, Champlin & Koehler, P.A.

(57) ABSTRACT

A remote seal assembly for a process transmitter includes a seal body containing a cavity sealed by a diaphragm. The seal body configured to be mounted to a process element containing a process fluid such that a first side of the diaphragm is exposed to the process fluid. A capillary contains a fill fluid that is in fluid communication with the cavity and a second side of the diaphragm. A coupling has a capillary recess and two cavities separated by a second diaphragm. The capillary extends through the capillary recess and connects to the coupling such that the fill fluid in the capillary is in fluid communication with one of the two cavities and the second diaphragm. A thermally conductive element preferably extends continuously along the capillary from the seal body toward the coupling and into the capillary recess without contacting the coupling.

11 Claims, 5 Drawing Sheets

(56) References Cited

U.S. PATENT DOCUMENTS

| | | | |
|---|---|---|---|
| 5,495,768 | A | 3/1996 | Louwagie et al. |
| 5,709,337 | A | 1/1998 | Moser et al. |
| 6,038,961 | A | 3/2000 | Filippi |
| 6,059,254 | A | 5/2000 | Sundet et al. |
| 6,120,033 | A | 9/2000 | Filippi |
| 7,036,381 | B2 | 5/2006 | Broden et al. |
| 7,080,558 | B2 * | 7/2006 | Broden ................ G01L 13/025 73/706 |
| 7,258,017 | B1 | 8/2007 | Hedtke |
| 7,258,021 | B2 | 8/2007 | Broden |
| 7,373,831 | B2 | 5/2008 | Broden |
| 7,377,174 | B2 | 5/2008 | Sundet |
| 7,497,123 | B1 | 3/2009 | Behm et al. |
| 7,784,351 | B2 | 8/2010 | Schumacher |
| 7,980,481 | B2 | 7/2011 | Fandrey et al. |
| 2005/0126296 | A1 | 6/2005 | Hedtke |
| 2005/0284227 | A1 | 12/2005 | Broden et al. |
| 2006/0162459 | A1 | 7/2006 | Broden |
| 2007/0220985 | A1 | 9/2007 | Hedtke |
| 2007/0234813 | A1 | 10/2007 | Hedtke |
| 2007/0272027 | A1 | 11/2007 | Hedtke |
| 2008/0083445 | A1 | 4/2008 | Chakraborty |
| 2010/0307254 | A1 * | 12/2010 | Klosinski ............ G01L 19/0007 73/756 |
| 2013/0005272 | A1 | 1/2013 | Shah |
| 2013/0005372 | A1 | 1/2013 | Strei et al. |
| 2014/0090476 | A1 | 4/2014 | Miller et al. |

FOREIGN PATENT DOCUMENTS

| | | |
|---|---|---|
| DE | 25 23 869 | 12/1976 |
| DE | 2808469 | 9/1979 |
| DE | 297 03 013 | 5/1997 |
| DE | 10 2005 061 217 | 4/2007 |
| EP | 0 812 414 | 12/1997 |
| EP | 1 364 174 | 11/2003 |
| WO | WO 2009/078918 | 6/2009 |

OTHER PUBLICATIONS

Model 1199 Diaphragm Seal Systems Manual, Rosemount, Fisher-Rosemount, 1997, p. iii-4-2.
Office Action from German Patent Application No. 102005012439.2, dated Jul. 23, 2007.
Office Action from Chinese Patent Application No. 200510054976.X, dated Aug. 24, 2007.
Invitation to Pay Additional Fees and Where Applicable, Protest Fee, from PCT/US2014/051628, dated Nov. 25, 2014.
Notification of Transmittal of the International Search Report and the Written Opinion of the International Searching from PCT/US2015/046657, dated Nov. 20, 2015.
Office Action from U.S. Appl. No. 14/493,679, dated Jul. 4, 2016.
Notification of Transmittal of the International Search Report and the Written Opinion of the International Authority from PCT/US2015/035244, dated May 19, 2016.

* cited by examiner

FILL FLUID THERMAL MANAGEMENT

BACKGROUND

Embodiments described below relate to remote seal assemblies for process controls. More specifically, the embodiments relate to a remote seal assembly with fill fluid thermal management.

In process control and monitoring environments, it is common to use pressure transmitters that sense the pressure of a process fluid in a conduit or a tank. Such pressure transmitters include an isolation diaphragm that isolates a pressure sensor in the pressure transmitter from the process fluid.

In some applications, it is not desirable to mount the pressure transmitter directly to the conduit or tank or it is not desirable to expose the isolation diaphragm of the pressure transmitter to the process fluid. In those situations, remote seals are used to isolate the diaphragm of the pressure transmitter from the fluid in the conduit or tank. Such remote seals mount to the conduit or tank and include their own isolation diaphragm, which has one side exposed to the process fluid. A conduit is connected between the isolation diaphragm of the remote seal and the isolation diaphragm of the pressure transmitter and contains an incompressible fill fluid that contacts both isolation diaphragms. The fill fluid transfers pressure changes at the remote seal's isolation diaphragm to the pressure transmitter's isolation diaphragm. Thus, the fill fluid provides fluid communication between the diaphragm of the remote seal that is in contact with the process fluid and the isolation diaphragm of the pressure transmitter.

For example, if the pressure of the process fluid increases, the isolation diaphragm of the remote seal is deflected toward the conduit causing the pressure in the fill fluid to increase. The pressure increase of the fill fluid then causes the diaphragm of the pressure transmitter to be deflected. The deflection of the pressure transmitter's diaphragm causes a second fill fluid in the pressure transmitter to increase in pressure and this pressure increase is sensed by the pressure sensor in the pressure transmitter.

In order for the fill fluid to transmit accurate pressure information, it must remain in a liquid state and cannot enter a semi-solid state known as the pour point or enter a semi-gaseous state due to vaporization. The state of the fill fluid, whether it is liquid, semi-solid or semi-gaseous, is dependent on the temperature of the process fluid and the temperature of the surrounding environment. In addition, the pressure of the process fluid can impact the pressure of the fill fluid such that a reduction in the process fluid pressure can produce a reduction in the fill fluid pressure that is large enough to cause partial vaporization of the fill fluid.

The discussion above is merely provided for general background information and is not intended to be used as an aid in determining the scope of the claimed subject matter. The claimed subject matter is not limited to implementations that solve any or all disadvantages noted in the background.

SUMMARY

A remote seal assembly for a process transmitter includes a seal body containing a cavity sealed by a diaphragm. The seal body configured to be mounted to a process element containing a process fluid such that a first side of the diaphragm is exposed to the process fluid. A capillary contains a fill fluid and is in fluid communication with the cavity and a second side of the diaphragm. A coupling has a capillary recess and two cavities separated by a second diaphragm. The capillary extends through the capillary recess and connects to the coupling such that the fill fluid in the capillary is in fluid communication with one of the two cavities and the second diaphragm. A thermally conductive element preferably extends continuously along the capillary from the seal body toward the coupling and into the capillary recess without contacting the coupling.

In a further embodiment, a remote seal assembly for a process transmitter includes a seal body containing a cavity sealed by a diaphragm. The seal body is configured to be mounted to a process element containing a process fluid such that a first side of the diaphragm is exposed to the process fluid. A capillary contains a fill fluid and is in fluid communication with the cavity and a second side of the diaphragm. A coupling is attached to the capillary and has two cavities separated by a second diaphragm, the fill fluid in the capillary is in fluid communication with one of the two cavities and the second diaphragm. A thermally conductive element extends continuously along the capillary from the seal body toward the coupling without contacting the coupling such that a portion of the capillary is exposed between the thermally conductive element and the coupling. The thermally conductive element is configured to transfer heat to the capillary such that the temperature of the fill fluid in the entire capillary remains above the pour point of the fill fluid when a temperature of air around the coupling is below the pour point of the fill fluid.

In a still further embodiment, a remote seal assembly includes a seal body containing a cavity sealed by a diaphragm. The seal body is configured to be mounted to a process element containing a process fluid such that a first side of the diaphragm is exposed to the process fluid. A capillary containing a fill fluid is in fluid communication with the cavity and a second side of the diaphragm, the fill fluid comprising one of a low melting temperature fusible metal alloy and a non-mercury based liquid metal.

In a still further embodiment, a remote seal assembly for a process transmitter includes a seal body containing a cavity sealed by a diaphragm. The seal body is configured to be mounted to a process element containing a process fluid such that a first side of the diaphragm is exposed to the process fluid. A capillary containing a fill fluid is in fluid communication with the cavity and a second side of the diaphragm. A housing around the capillary has a first end made of metal that is fixed to the seal body, a second end made of metal, and an inner section comprising a ceramic that separates the first end from the second end.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

In the past, certain process control environments have made it practically impossible to utilize a pressure transmitter to measure the pressure of a process fluid. In particular, environments in which the process fluid is at a high temperature in excess of 315° C. and the external environment is at a low temperature below 0° C. make it impossible to position the pressure transmitter such that the pressure transmitter does not overheat while ensuring that the fill fluid does not drop below its pour point. In particular, with such high process fluid temperatures, it is not possible to mount the transmitter directly to the conduit because the pressure transmitter will overheat due to the heat in the process fluid. However, if a remote seal is used, the fill fluid will begin to gel due to the coldness of the environment around the fill fluid conduit.

The various embodiments described below provide remote seals that can work with high temperature process fluids in cold or moderate process control environments. In embodiments described below, there are three features that can be used to allow a pressure transmitter to be used in these environments. The first feature is a fill fluid made of one of a low melting temperature fusible alloy and a non-mercury based liquid metal. The second feature is the use of a thermal conductor around the fill fluid conduit such that the thermal conductor terminates before making contact with a coupling that connects to the pressure transmitter or connects to an additional capillary. The third feature is the use of a ceramic to provide a thermal break between the pressure transmitter and the process fluid conduit or tank such that the pressure transmitter can be positioned closer to the process fluid conduit or tank.

Figure 1:
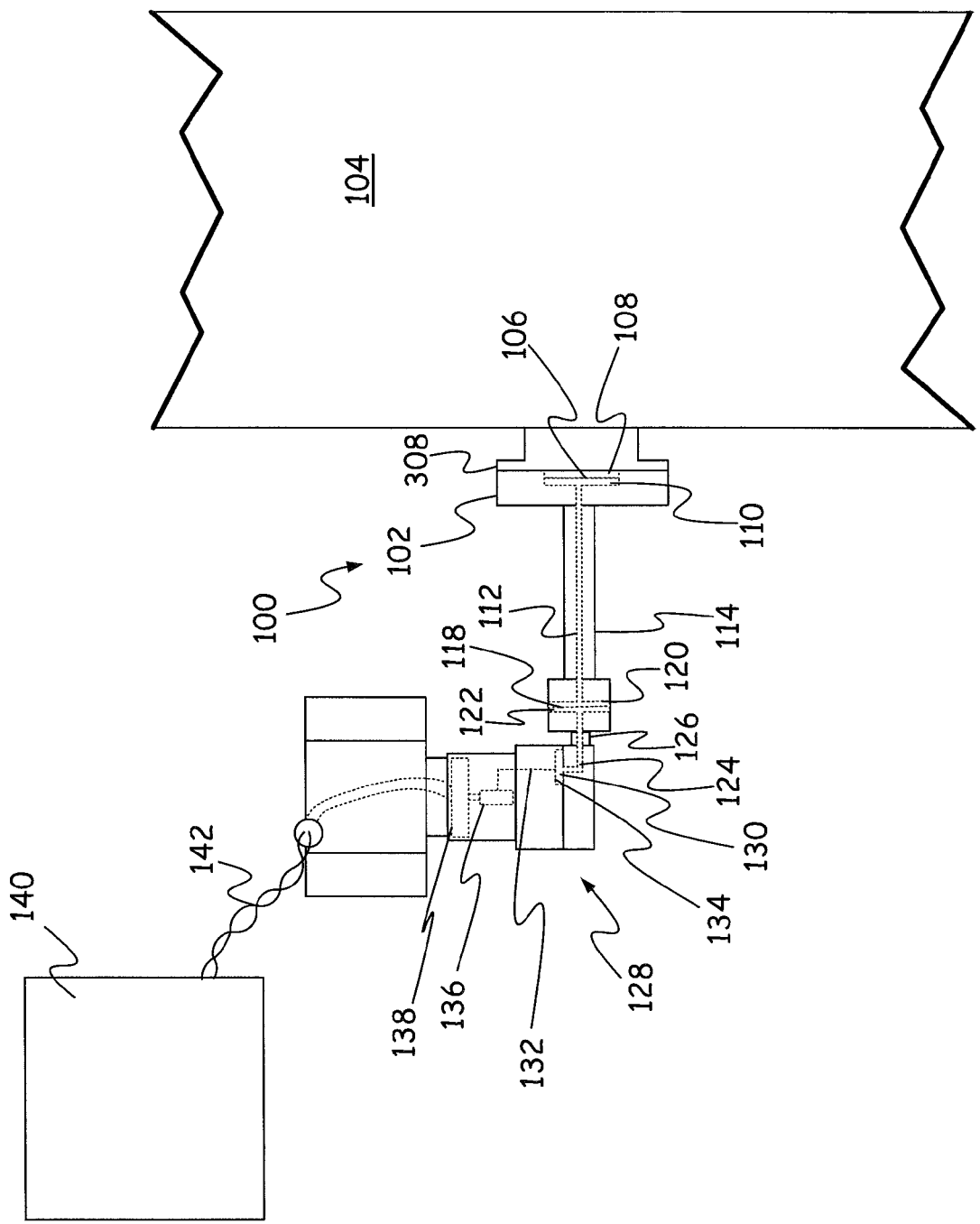
FIG. 1 provides a first embodiment of a remote seal.
Figure 2:
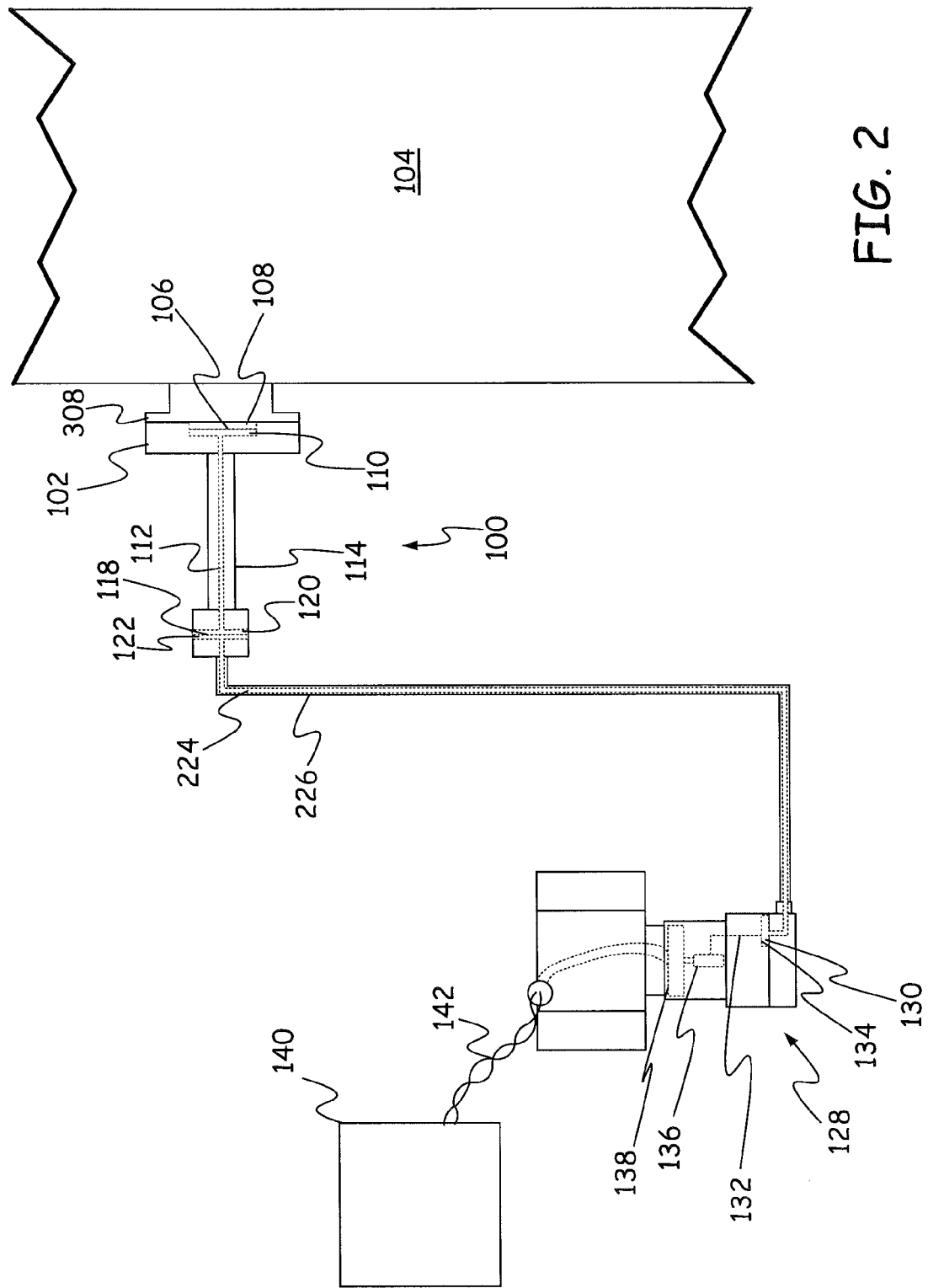
FIG. 2 provides a second embodiment of a remote seal.

FIGS. 1 and 2 depict two alternative configurations for practicing various embodiments. In particular, FIG. 1 provides a remote sealing system with a coupling where a pressure transmitter is mounted directly to the coupling. In FIG. 2, the pressure transmitter is mounted apart from the coupling on the remote seal.

Specifically, in FIG. 1, a remote seal assembly 100 is provided that includes a seal body 102 that is attached to a flange 308 of a process element 104, which can take the form of a conduit, a pipe, a container or tank, or any other process element containing a process fluid. Seal body 102 includes a flexible diaphragm 106 positioned to seal a cavity 108 that is exposed to the process fluid from a cavity 110 that is isolated from the process fluid and that contains a fill fluid. Diaphragm 106 is able to transmit changes in the pressure of the process fluid to the fill fluid in cavity 110. Cavity 110 is in fluid communication with a capillary 112 that is protected by a housing 114. Housing 114 may be welded to seal body 102 and to a coupling body 116. Coupling body 116, also referred to as a transfer body, includes a flexible diaphragm 118 that isolates a cavity 120 from a cavity 122. Cavity 120 is in fluid communication with capillary 112 and is filled with the same fill fluid as capillary 112 and cavity 110. Cavity 122 is in fluid communication with a capillary 124 that extends out of coupling body 116. Cavity 122 and capillary 124 are filled with a second fill fluid. Diaphragm 118 is able to transmit changes in the pressure of the fill fluid in cavity 120 to the second fill fluid in cavity 122.

A protective housing 126 protects capillary 124 and mounts pressure transmitter 128 to coupling 116. Within pressure transmitter 128, capillary 124 is in fluid communication with a cavity 130 that is sealed from a capillary 132 by a flexible diaphragm 134. Capillary 132 contains a third fill fluid. Diaphragm 134 is able to transmit changes in the pressure of the second fill fluid in cavity 130 to the third fluid in capillary 132.

As shown above, changes in pressure in the process fluid in process element 104 are transmitted through diaphragm 106 to the fill fluid in conduit 112 then through diaphragm 118 to the second fill fluid in conduit 124 and finally to the third fill fluid in capillary 132 through diaphragm 134. A sensor 136 in pressure transmitter 128 senses a pressure and pressure changes in the fill fluid of capillary 132 and thereby measures pressure changes in the process fluid of process element 104. In FIG. 1, sensor 136 senses a single pressure value. In other embodiments, sensor 136 is a differential pressure sensor that receives pressure information from a second capillary system (not shown) and is able to determine a differential pressure between the pressure of capillary 132 and the other capillary (not shown). Sensor 136 provides sensor values to circuit elements 138, which use the sensor values to generate one or more process variables that are transmitted to a control room 140. The process variables can include one or more of static pressure values, differential pressure values, liquid levels, flow rates, volumetric flow rates, and mass flow rates, for example. The process variables can be transmitted through a wired communication path such as a two wire process loop 142 or may be communicated to control room 140 using a wireless communication path.

As shown in FIG. 1, remote seal assembly 100 separates transmitter 128 from process element 104 so that transmitter 128 is not negatively impacted by the high temperatures of a process fluid present in process element 104. However, the fill fluid in capillary 112 remains exposed to the high temperatures of the process fluid due to thermal conduction through diaphragm 106 and seal body 102. In order for the fill fluid to transmit the pressure properly, it cannot vaporize when exposed to the temperatures of the process fluid and it cannot have its temperature drop below its pour point. Keeping the fill fluid temperature from dropping below the pour point can be challenging in a cold external environment because capillary 112 radiates heat creating a gradient of temperatures along capillary 112. As such, points farther from diaphragm 106 along capillary 112 are cooler than points that are closer to diaphragm 106.

FIG. 2 provides an alternative embodiment in which remote seal assembly 100 is augmented by a longer capillary 224 and protective housing 226 in place of capillary 124 and housing 226. Longer capillary 224 and protective housing 226 allow pressure transmitter 128 to be positioned further from coupling 116 and process element 104. Capillary 224 is in fluid communication with cavity 122 of coupling 116 and with cavity 130 of pressure transmitter 128. Cavities 122 and 130 and capillary 124 are filled with the second fill fluid that transmits pressure changes from diaphragm 118 of coupling 116 to diaphragm 134 in pressure transmitter 128. The remaining components of FIG. 2 operate in a similar fashion to the similarly numbered components of FIG. 1.

Figure 3:
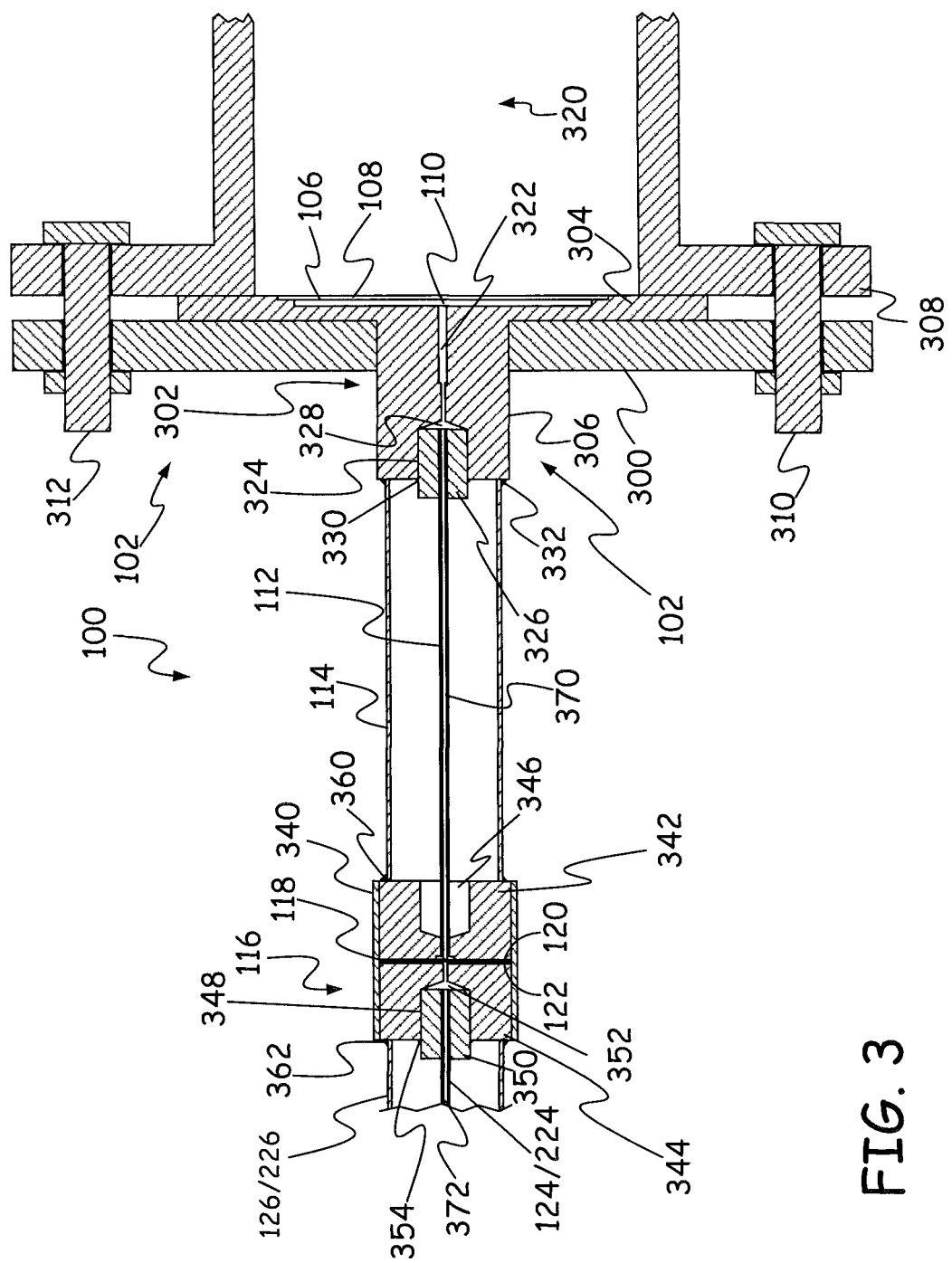
FIG. 3 provides an expanded sectional view of a portion of the remote seals of FIGS. 1 and 2.

FIG. 3 provides an enlarged sectional view of remote seal assembly 100 in accordance with one embodiment. As shown in FIG. 3, seal body 102 is formed of a flange 300 and a diaphragm housing 302, which includes a backing plate 304 and a connection portion 306. Flange 300 is coupled to a process flange 308 by fasteners, such as fasteners 310 and 312, which press flange 300 toward process flange 308 so that backing plate 304 comes into sealing contact with process flange 308. Diaphragm 106 is welded to backing plate 304 to define cavity 110 between backing plate 304 and diaphragm 106. Cavity 108 in backing plate 304 is exposed to process fluid 320 that is carried by process element 104.

Connection portion 306 of diaphragm housing 302 defines a bore 322 that is in fluid communication with cavity 110 and with an opening 324 that receives a universal capillary fitting 326. The base of universal capillary fitting 326 and connection portion 306 define a cavity 328 that is in fluid communication with bore 322. Universal capillary fitting 326 is sealed to capillary 112, which passes through the interior of universal capillary fitting 326 so that it is in fluid communication with cavity 328. Universal capillary fitting 326 may be welded to connection portion 306 at weld points 330. In addition, outer housing 114 may be welded to connection portion 306 at welds 332.

Coupling 116 includes an outer sleeve 340 that is welded to and surrounds two connection portions 342 and 344. Connection portions 342 and 344 each define a respective recess or opening 346 and 348 that can receive a universal capillary fitting. In FIG. 3, only opening 348 actually receives a universal capillary fitting 350. Diaphragm 118 is welded to one of connection portions 342 or 344 to form cavities 122 and 120. Capillary 112 is sealed to connection portion 342 and is in fluid communication with cavity 120. Universal fitting 350 is sealed to capillary 124/224 and is inserted into opening 348 to define a cavity 352 between the base of universal capillary fitting 350 and connection portion 344. In some embodiments, universal capillary fitting 350 is welded to connection portion 344 at welds 354.

Outer protective housing 114 is welded to connection portion 342 at welds 360 and outer housing 126/226 is welded to connection portion 344 at weld 362. In the embodiment of FIG. 3, a first type of fill material 370 is present in cavity 120, capillary 112, cavity 328, bore 322, and cavity 110. A second type of fill fluid 372 is within capillary 124/224 and cavity 122. In accordance with one embodiment, fill fluid 370 is one of a low melting temperature fusible alloy and a non-mercury based liquid metal.

Low melting temperature fusible alloys are available in a variety of compositions. Some of those compositions are known as Field's metals. By varying the composition and makeup of a fusible alloy, the mechanical properties of the alloy can be catered to suit various performance needs. In particular, the melting point of the fusible alloy can be varied by changing the composition of the alloy. In accordance with one embodiment, the composition is selected to obtain a melting point that is near room temperature, which is between 20° C. and 23.5° C. By selecting a fusible alloy with a melting point near room temperature, the fusible alloy will tend to be liquid at start up and will not need time to allow the process heat to melt the alloy before measurements can be taken. Further, by using a fusible alloy with a melting temperature near room temperature, it is possible to fill capillary 112 and cavities 120, 328 and 110 during manufacturing without requiring a heater to heat the alloy so that it can flow into the cavities and the capillary. In some embodiments, a fusible alloy with a melting temperature above room temperature is used and after installation, the remote seal is provided enough time to receive heat from the process in order to melt the alloy. In other embodiments, a preheating unit is used to provide additional heat to melt the fusible alloy faster.

Non-mercury based liquid metal is liquid at room temperature. Some of these materials can go as low as −10° C. before freezing and above 500° C. before vaporizing giving them the widest temperature range of all available fill fluids. These fluids also have extremely low vapor pressure, down to $10^{-8}$ Torr at 500° C., making them a superb vacuum-rated fill fluid.

Both low melting temperature fusible alloys and non-mercury based liquid metals have thermal expansion coefficients that are similar to the thermal expansion coefficients of capillary 112. As a result, when capillary 112 and the low melting temperature fusible alloys and non-mercury based liquid metals are heated, they expand at the same rate resulting in less pressure measurement errors. In addition, the low melting temperature fusible alloy and the non-mercury liquid metal 370 are such that they do not vaporize when process fluid 320 is greater than 425° C. and less than 800° C. In addition, the low melting temperature fusible alloy and the non-mercury liquid metal do not vaporize when process fluid 320 is between $10^{-3}$ Torr and $10^{-8}$ Torr.

One challenge with using low melting temperature fusible alloys and non-mercury based liquid metal is that some of these materials are quite expensive. In embodiments that use long capillary lines for the remote seals, such as the embodiment shown in FIG. 2, using these materials for the entire capillary line is cost prohibitive. In the embodiment of FIG. 3, this is overcome by using the low melting temperature fusible alloys or the non-mercury based liquid metal as fill fluid 370 while using a less expensive fill fluid 372 in capillaries 124/224. In this way, the more expensive fill fluid is used over a small segment of the remote seal because it can tolerate the high temperatures of the process fluid 320. At the point where coupling 116 is located, the amount of heat transmitted from process fluid 320 is greatly reduced allowing a less expensive process fluid 372 to be used for the remaining portion of the remote seal or for connecting to the transmitter. For example, silicone 705 fill fluid can be used as fill fluid 372 while the low temperature fusible alloy or the non-mercury liquid metal is used as fill fluid 370. In one embodiment, the length of capillary 112 is set based on the expected range of temperatures for the process fluid such that the low melting temperature fusible alloys and non-mercury based liquid metal remains in a liquid state using heat from the process fluid.

Figure 4:
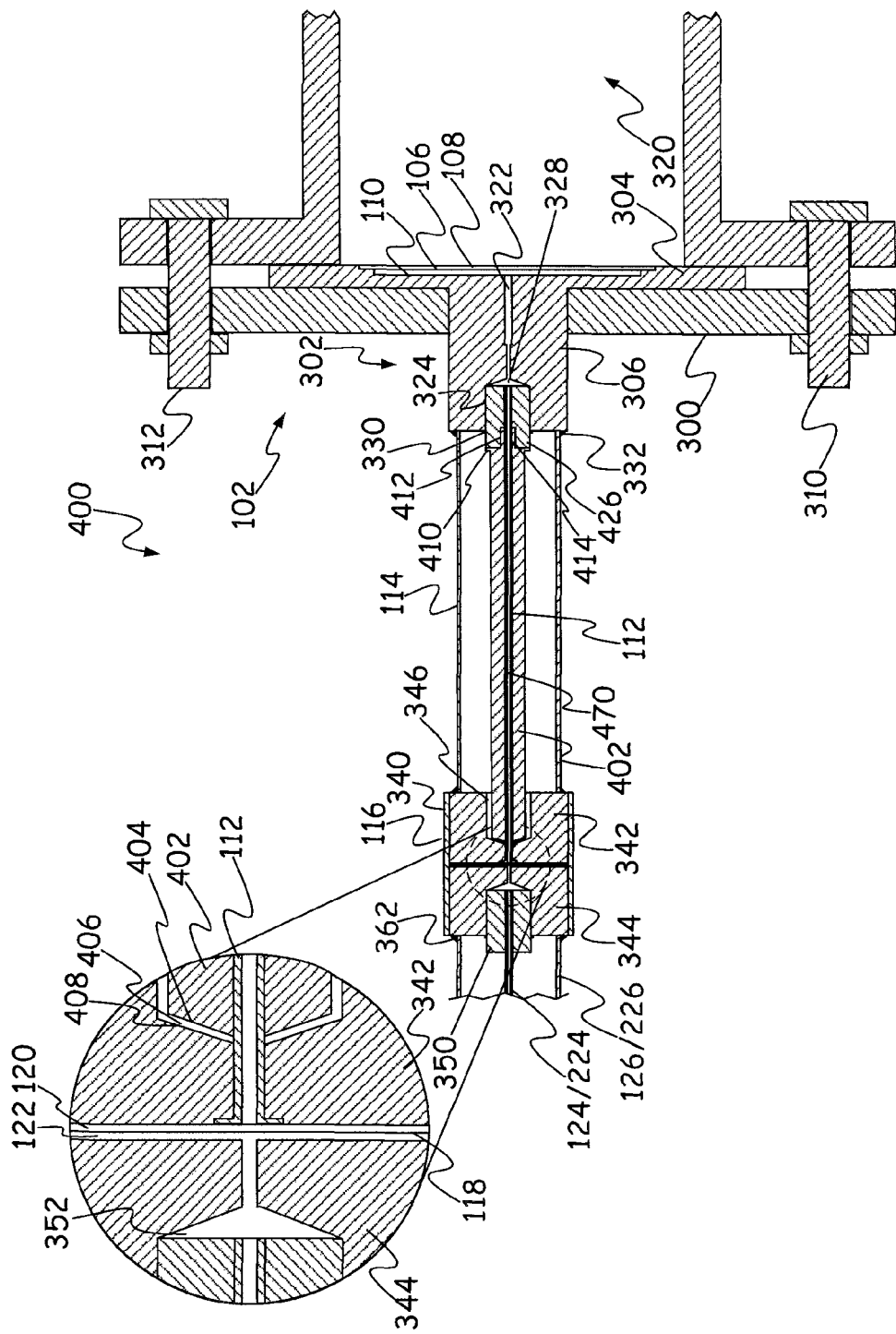
FIG. 4 provides an expanded sectional view of a second embodiment of a portion of the remote seals of FIGS. 1 and 2.

FIG. 4 provides a sectional view of an alternative embodiment of a remote seal assembly 400 that can be used as remote seal assembly 100 in FIGS. 1 and 2. In FIG. 4, elements that are common to FIG. 3 are designated with same numbers as in FIG. 3. In the embodiment of FIG. 4, a thermally conductive element 402 extends continuously along capillary 112 from seal body 102 and into capillary recess 346 without contacting coupling 116. As shown in the magnified portion of coupling 116, thermally conductive element 402 is dead ended or has a free end 404 such that there is a space 406 between free end 404 and a surface 408 of connecting portion 342 of coupling 116. Within space 406, a portion of capillary 112 is exposed.

Thermally conductive element 402 circumferentially surrounds capillary 112 and is welded to a capillary fitting 426 at weld points 410. In addition, a portion 414 of thermally conductive element 402 extends into a recess 412 of capillary fitting 426 to improve the thermal transfer between capillary fitting 426 and thermally conductive element 402.

Heat from process fluid 320 is transferred through diaphragm housing 302 to capillary fitting 426 and then to thermally conductive element 402. Thermally conductive element 402 is configured to transfer heat from seal body 102 to capillary 112 from capillary fitting 426 to free end 404. The heat conducted by thermally conducting element 402 maintains the temperature of a fill fluid 470 in capillary 112 above the pour point of the fill fluid. In accordance with one embodiment, the temperature of fill fluid 470 is maintained above the pour point along the entire length of capillary 112 even when the temperature of the air around coupling 116 is below the pour point of fill fluid 470. Through this heating, it is possible to use a fill fluid 470 that has a pour point that is higher than the temperature of the surrounding environment in which remote seal assembly 400 is used. Without thermally conductive element 402, such a fill fluid would begin to gel in the portions of capillary 112 that are near coupling 116 due to the cooling effect of the surrounding environment on capillary 112. With thermally conductive element 402, heat from process fluid 320 is mechanically conducted to keep capillary 112 and fill fluid 470 warm.

Space 406 is provided between free end 404 of thermally conductive element 402 and coupling 116 to reduce the amount of heat that coupling 116 receives. If coupling 116 is heated, it will transfer that heat to fill fluid 372 and may cause fill fluid 372 to evaporate thereby negatively impacting pressure measurements. By providing space 406, air is able to cool capillary 112 sufficiently that it does not heat coupling 116 to a point where fill fluid 472 is adversely affected. In accordance with one embodiment, it is possible to obtain a 127° C. temperature drop between free end 404 of thermally conductive element 402 and the end of capillary 112 where connecting portion 342 defines a portion of cavity 120.

The temperature at any point along capillary 112 can be determined using mathematical modeling based on factors such as the process temperature, the ambient temperature, and the thickness and length of thermally conductive element 402, for example. Alternatively, experiments may be performed to determine the temperature gradient along capillary 112 for different combinations of process temperature and ambient temperature.

Using the embodiment of FIG. 4, it has been found that a fill fluid that is only rated for operations from between 20° C. to 370° may be used as fill fluid 470 in an environmental temperature of −60° C. when the process fluid temperature is 250° C. In an environment with a temperature of −60° C., such a fill fluid would normally begin to gel if thermally conductive element 402 were not present.

Thermally conductive element 402 also provides advantages over capillary traces that receive heat from external sources. Such heat trace systems require electrical power for operation and therefore are expensive to operate. In addition, such heat trace systems require temperature controllers for optimal performance.

Figure 5:
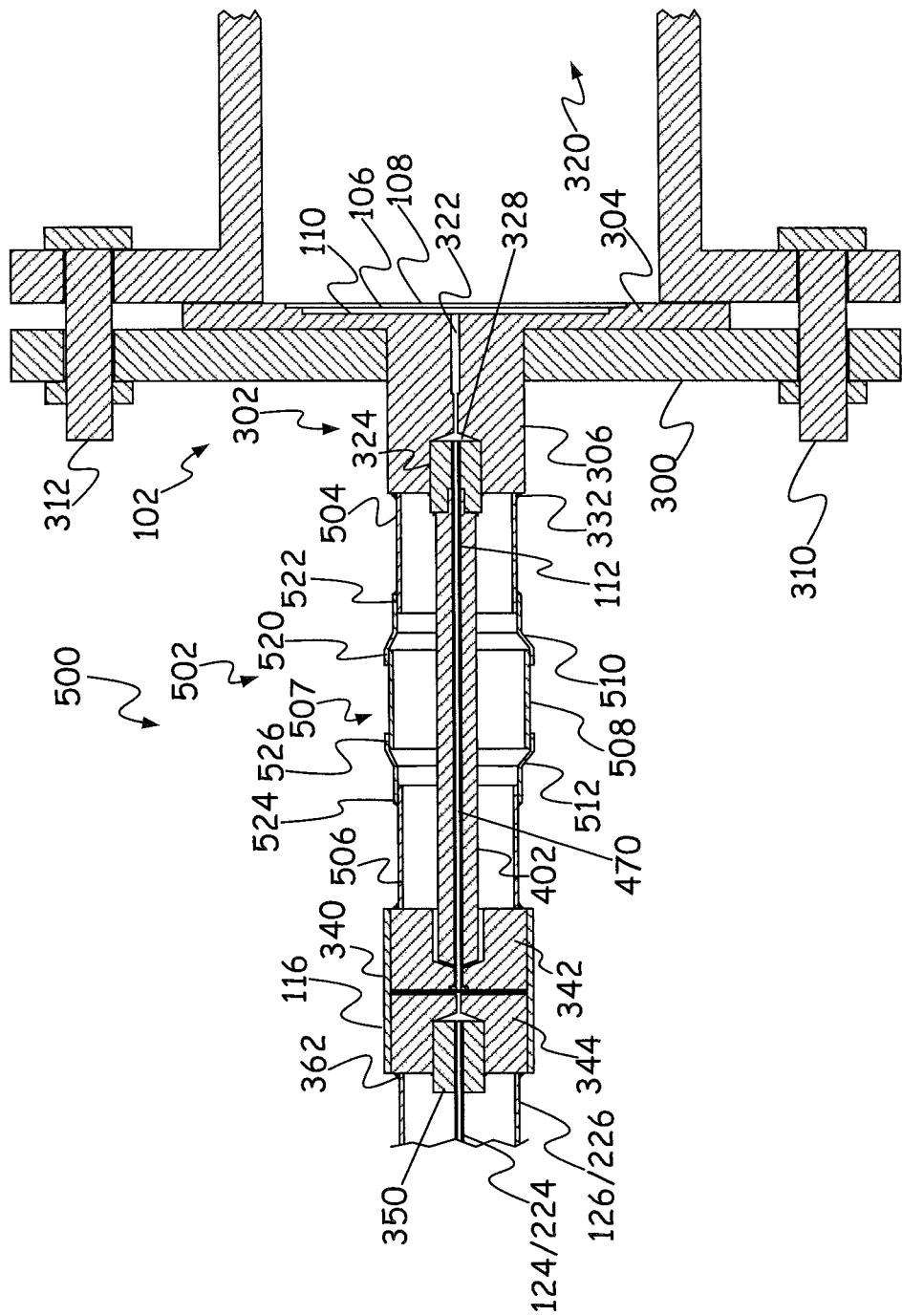
FIG. 5 provides an expanded sectional view of a third embodiment of a portion of the remote seal of FIGS. 1 and 2.

FIG. 5 provides an additional embodiment of a remote seal assembly 500 that can be used as remote seal assembly 100 of FIGS. 1 and 2. Remote seal assembly 500 further thermally isolates coupling 116 from the heat of process fluid 320. Elements in FIG. 5 that are shown in FIG. 4 are referenced with the same numbers as in FIG. 4.

In FIG. 5, external housing 114 has been replaced with external housing 502, which protects capillary 112 and thermally conductive element 402. Protective housing 502 is constructed of a first metallic end section 504, a second metallic end section 506 and an inner section 507 that separates end section 504 from end section 506 and includes a thermal break material. End section 504 is cylindrical and is welded to connecting portion 306 of diaphragm housing 302. End section 506 is also cylindrical and is welded to connecting portion 342 of coupling 116. Inner section 507 comprising a cylindrical ceramic portion 508, a first weld adapter 510 and a second weld adapter 512. First weld adapter 510 has a first cylindrical portion 520 that is attached to ceramic piece 508 and a second cylindrical portion 522 that is welded to end section 504. Welded adapter 512 has a first cylindrical portion 526 that is attached to an opposing end of ceramic piece 508 and a second cylindrical portion 524 that is welded to end section 506. In accordance with one embodiment, cylindrical portions 520 and 526 are attached to ceramic piece 508 through brazing.

Ceramic piece 508 is one example of a thermal break material that has a low thermal conductivity so that less heat is transferred from diaphragm housing 302 to coupling 116. Examples of possible materials for ceramic piece 508 include Zirconia ($ZrO_2$), which has high strength, Excellent wear resistance, high hardness, excellent chemical resistance, high fracture toughness and very low thermal conductivity; and Silicon Nitride ($Si_3N_4$), which has high scratch/wear resistance, high strength, high fracture toughness, good thermal shock resistance, and great chemical resistance. Depending on the composition of the ceramic, the thermal conductivity of the chosen ceramic will be a factor of ½ to 1/10 the thermal conductivity of stainless steel. Therefore, the amount of heat input into coupling 116 by way of the ceramic break can be significantly reduced.

Although the embodiment of FIG. 5 uses the ceramic thermal break 507 in combination with the thermally conductive element 402, in other embodiments, the embodiment of FIG. 5 can be practiced without thermally conductive element 402.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A remote seal assembly for a process transmitter, the remote seal assembly comprising:
    a seal body containing a cavity sealed by a diaphragm, the seal body configured to be mounted to a process element containing a process fluid such that a first side of the diaphragm is exposed to the process fluid;
    a capillary containing a fill fluid is in fluid communication with the cavity and a second side of the diaphragm;
    a coupling having a capillary recess and two cavities separated by a second diaphragm, the capillary extending through the capillary recess and connecting to the coupling such that the fill fluid in the capillary is in fluid communication with one of the two cavities and the second diaphragm; and
    a thermally conductive element extending continuously along the capillary from a first end of the thermally conductive element at the seal body to a portion of the thermally conductive element located in the capillary recess such that a space containing air is provided around the entire portion of the thermally conductive element located in the capillary recess and such that a portion of the capillary is exposed to the space, wherein the air in the space aids in transferring heat away from the exposed portion of the capillary.

2. The remote seal assembly of claim 1 wherein a process transmitter is mounted to the coupling.

3. The remote seal assembly of claim 1 wherein the remote seal assembly is configured to provide a temperature drop along the capillary in excess of 126 degrees Celsius between an end of the thermally conductive element within the capillary recess and an end of the capillary.

4. The remote seal assembly of claim 1 wherein the fill fluid comprises one of a low melting temperature fusible metal alloy and a non-mercury based liquid metal.

5. The remote seal assembly of claim 1 wherein the thermally conductive element is mounted to the seal body and is configured to transfer heat from the seal body to the capillary.

6. The remote seal assembly of claim 5 wherein the thermally conductive element is welded to a fitting and the fitting is mounted to the seal body.

7. The remote seal assembly of claim 1 wherein the coupling is further connected to a second capillary such that a second fill fluid in the second capillary is in fluid communication with the other of the two cavities of the coupling and the second diaphragm.

8. The remote seal assembly of claim 7 wherein the second capillary is further connected to a process transmitter.

9. A remote seal assembly for a process transmitter, the remote seal assembly comprising:
  a seal body containing a cavity sealed by a diaphragm, the seal body configured to be mounted to a process element containing a process fluid such that a first side of the diaphragm is exposed to the process fluid;
  a capillary containing a fill fluid is in fluid communication with the cavity and a second side of the diaphragm;
  a coupling attached to the capillary and having two cavities separated by a second diaphragm, the fill fluid in the capillary being in fluid communication with one of the two cavities and the second diaphragm; and
  a thermally conductive element extending continuously along the capillary from a first end of the thermally conductive element at the seal body to a second end of the thermally conductive element near the coupling such that a portion of the capillary is exposed to air in a space that isolates the second end of the thermally conductive element such that the second end of the thermally conductive element only contacts the capillary, wherein the air in the space assists in cooling the exposed portion of the capillary and wherein the thermally conductive element is configured to transfer heat to the capillary such that the temperature of the fill fluid in the entire capillary remains above the pour point of the fill fluid when a temperature of air around the coupling is below the pour point of the fill fluid.

10. The remote seal assembly of claim 9 wherein the fill fluid comprises one of a low melting temperature fusible metal alloy and a non-mercury based liquid metal.

11. The remote seal assembly of claim 9 wherein a process transmitter is mounted to the coupling.

* * * * *

UNITED STATES PATENT AND TRADEMARK OFFICE
CERTIFICATE OF CORRECTION

Page 1 of 1

PATENT NO. : 9,772,246 B2
APPLICATION NO. : 14/501691
DATED : September 26, 2017
INVENTOR(S) : Michael James Hoffman et al.

It is certified that error appears in the above-identified patent and that said Letters Patent is hereby corrected as shown below:

On the Title Page

Page 2 In the References Cited:
Under Other Publications:
Lines 9-11 "Notification of Transmittal of the International Search Report and the Written Opinion of the International Searching from PCT/US2015/046657, dated November 20, 2015." should read -- Notification of Transmittal of the International Search Report and the Written Opinion of the International Searching Authority from PCT/US2015/046657, dated November 20, 2015. --

Lines 13-15 "Notification of Transmittal of the International Search Report and the Written Opinion of the International Authority from PCT/US2015/035244, dated May 19, 2016." should read -- Copy of Notification of Transmittal of the International Search Report and the Written Opinion of the International Searching Authority from PCT/US2015/035244, dated May 19, 2016. --

Signed and Sealed this
Sixth Day of November, 2018

Andrei Iancu
*Director of the United States Patent and Trademark Office*